United States Patent

Kitaura et al.

[11] Patent Number: 4,970,594
[45] Date of Patent: Nov. 13, 1990

[54] TELEVISION VIDEO SIGNAL CONTROL SYSTEM

[75] Inventors: Hiromu Kitaura, Osakasayama; Yuichi Ninomiya; Yoshimichi Ohtsuka, both of Kawasaki; Yoshinori Izumi, Tokyo, all of Japan

[73] Assignees: Matsushita Electric Industrial Co., Ltd., Osaka; Nippon Hoso Kyokai, Tokyo, both of Japan

[21] Appl. No.: 314,102

[22] Filed: Feb. 23, 1989

[51] Int. Cl.[5] .............................................. H04N 5/18
[52] U.S. Cl. .................................... 358/172; 358/174
[58] Field of Search ............... 358/174, 178, 172, 171, 358/13, 34, 148

[56] References Cited

U.S. PATENT DOCUMENTS

| 4,163,248 | 7/1979 | Heitmann | 358/13 |
| 4,535,357 | 8/1985 | Penney | 358/148 |
| 4,742,392 | 5/1988 | Hashimoto | 358/171 |
| 4,766,485 | 8/1988 | Takayama | 358/34 |

FOREIGN PATENT DOCUMENTS

| 0016919 | 2/1979 | Japan | 358/174 |
| 62-69778 | 3/1987 | Japan . | |
| 0289058 | 12/1987 | Japan . | |
| 63-50271 | 3/1988 | Japan . | |
| 0050274 | 3/1988 | Japan . | |

OTHER PUBLICATIONS

"Mono-Channel Transmission System Using Earth Satellite for High-Definition Television (HD-TV Broadcasting System using Single Channel Satellite)", by Yuichi Ninomiya et al, The Institute of Television Engineers of Japan, Research Society Report, TEBX 95-2 Mar. 22, 1984, vol. 7, No. 44.

Primary Examiner—Tommy P. Chin
Assistant Examiner—James Juo
Attorney, Agent, or Firm—Stevens, Davis, Miller & Mosher

[57] ABSTRACT

A television video signal control system is disclosed in which an amplitude control signal and a clamp voltage control signal digitally detected in the automatic gain control and clamp voltage control of a television signal receiver respectively are applied alternately to a single D/A converter. The resulting analog signal is sampled and held alternately at holding circuits corresponding to the two control signals. A D/A converter for converting the two control signals from digital to analog state is thus saved as compared with the prior art.

2 Claims, 3 Drawing Sheets

TELEVISION VIDEO SIGNAL CONTROL SYSTEM

BACKGROUND OF THE INVENTION

The present invention relates to a system for automatic gain control and clamp voltage control for a TV (television) receiver.

A band-compressed transmission system called MUSE has been proposed in which a High-Vision (high-definition) video signal for producing images of higher definition or resolution than in the existing standard TV systems is capable of being transmitted by one channel of 27 MHz in bandwidth of a broadcasting satellite.

Such a system is disclosed in "Mono-Channel Transmission System Using Earth Satellite for High-Definition Television (MUSE)" by Yuichi Ninomiya, et al., Television Society Technological Report, System Circuit Research Group, TEBS 95-2, Mar. 22, 1984, Television Society Technological Report Vol. 7, No. 44.

According to the system, which is described in the above-mentioned reference and will not be described here in detail, the signal transmitted is of the type of a component signal composed of a color difference signal time-base compressed and multiplexed with a luminance signal. Further, the signal is of a type provided with a positive polarity of sync signal in order to prevent what is called "synchronization loss" or uneasiness in going into synchronization. For demodulation of the signal, the interpolation of subsampling is necessary using a frame and field memories, which in turn requires the processing of a digital signal. For the purpose, the TV signal is converted into a digital signal by an analog-digital converter (hereinafter referred to as "A/D converter") at the entrance of a decoder. The amplitude and DC potential of the TV signal applied to the A/D converter is thus required to be controlled accurately. Especially, in view of the fact that the TV signal for the MUSE system is comprised of a color signal multiplexed as a component signal, a change in the DC potential makes impossible accurate reproduction of the hue of a demodulated image. In order to prevent this inconvenience, the TV signal of the system is provided with a signal portion so-called the clamp level line representing a reference DC potential level, which is a central level of the signal amplitude. If this signal is converted into a digital signal of 8 bits, for example, the clamp voltage is controlled in such a manner that the potential of the clamp level line is always positioned at the 128th of 256 steps. For this purpose, a clamp level detection circuit is inserted. The 100% amplitude of this signal is always required over the vertical sync signal period called the frame pulse in the video signal. This condition is met by controlling the gain of an amplifier at the entrance of the A/D converter in such a way that the amplitude of the frame pulse is kept always at a predetermined level when the signal was converted into the 8-bit digital signal. This type of gain control is necessary not only for demodulation of signals received in satellite broadcasting but also for compensating for variations in signal amplitude among units when switching other signal sources including VTR and video disk.

As explained above, two types of video signal control are necessary for receiving a television signal image in the above system. For either type, the control circuit processes a signal in analog form while the detection circuit is supplied with a digital signal, so that the interface between the detection circuit and the control circuit naturally requires a digital-analog converter (hereinafter referred to the D/A converter) for converting the digital control signal into an analog control signal. The problems associated with this procedure will be explained with reference to FIG. 2. In FIG. 2, reference numeral 1 designates a TV signal input terminal of MUSE system, numeral 2 a gain control circuit for controlling the amplitude of the TV signal by a control voltage applied externally, numeral 3 a clamp circuit in which the DC potential of the TV signal controlled to a predetermined amplitude by the gain control circuit 2 is controlled by a control voltage applied externally, numeral 4 an A/D converter, and numeral 5 a demodulation circuit for demodulating the original MUSE signal into the corresponding high-definition signal by the digital signal processing. Numeral 6 designates a clamp level detection circuit for digitally detecting the deviation of the DC potential of the clamp level line from the level of 128/256 and generating a clamp level control signal. Numeral 7 designates a D/A converter for converting the clamp level control signal in digital form into an analog voltage. Numeral 8 designates an amplitude detection circuit for detecting the amplitude of a frame pulse set to 100% amplitude, digitally detecting the difference thereof from a maximum amplitude (which is not set to the maximum level of the dynamic range but is generally set with some margin above and under) determined by the demodulation circuit and generating a gain control signal. Numeral 9 designates a D/A converter for converting the gain control signal in digital form into an analog voltage.

In the above-mentioned arrangement, the two control signals are required to have at least eight bits, or preferably, 10 to 12 bits in order to maintain the control accuracy, thereby necessitating two D/A converters of the degree of accuracy for an increased cost. Further, two groups of digital control signals with 8 to 12 bits are required, and the circuit arrangement is inevitably complicated. At the time of channel switching or power-source on switching when the system is out of synchronization, the detection circuit is not expected to operate normally with an abnormal control signal generated, with the result that the amplitude and clamp potential of the TV signal applied to the A/D converter cease to be normal. The pull-in of synchronization is prevented, thereby leading to the problem of a longer time required before a normal image is reproduced.

SUMMARY OF THE INVENTION

The object of the present invention is to provide a television video signal control system comprising an amplitude detection circuit for detecting a portion of a TV video signal always with a constant amplitude such as sync signal portion and generating a first digital signal for gain control, a clamp level detection circuit for detecting a reference DC potential level of the TV video signal and generating a second digital signal to control the clamp potential, a D/A converter for receiving first and second digital signals alternately to convert them into corresponding analog voltages, first and second voltage holding circuits switched alternately for sampling and holding the converted analog voltages respectively in accordance with the first and second digital signals, a gain control circuit for controlling the amplitude of the input TV video signal by the output voltage of the first voltage holding circuit, and a clamp circuit for controlling the DC potential of the TV video signal supplied to an A/D converter by the output voltage of the second voltage holding circuit.

According to the above arrangement of the present invention, there is provided a television video signal control system wherein the amplitude control signal and the clamp voltage control signal digitally produced are applied alternately to the single D/A converter and the resulting analog voltage signals are alternately sampled and held by the respective holding circuits corresponding to the two control signals, thereby eliminating one of such D/A converters which was otherwise needed for converting the two control signals from digital to analog.

According to the present invention, the single D/A converter is well used for converting the digital control signal into the analog voltage on the one hand, and the number of signal lines for transmitting data from the two detection circuits to the D/A converter is reduced by one half as compared with those of the prior art on the other, thereby conveniently reducing the equipment size. Further, the reduction in the number of high-cost D/A converters results in a great cost reduction.

Furthermore, the image disturbance due an to asynchronous state at the time of channel switching or power-source on switching is minimized for an improved quality of the receiver.

DESCRIPTION OF THE PREFERRED EMBODIMENTS

Figure 1:
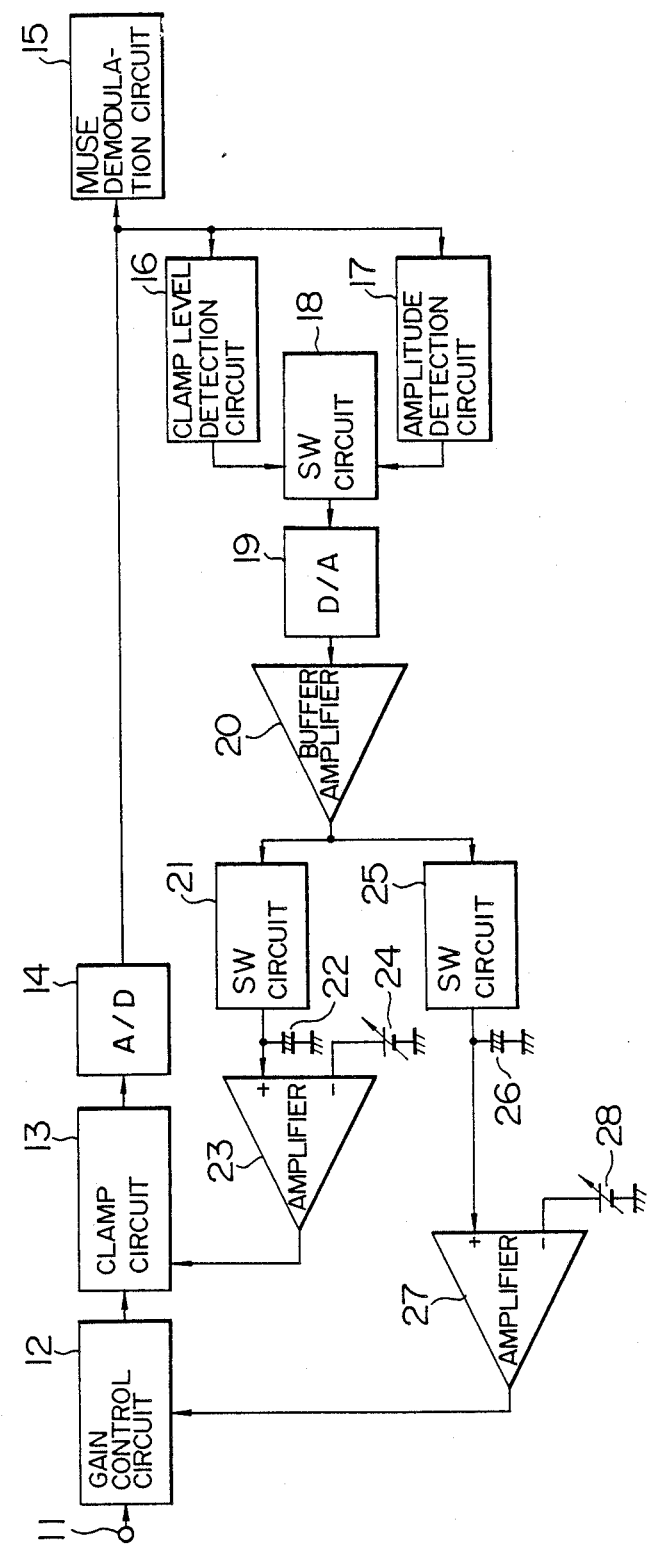
FIG. 1 is a block diagram showing a television video signal control system according to an embodiment of the present invention.
Figure 2:
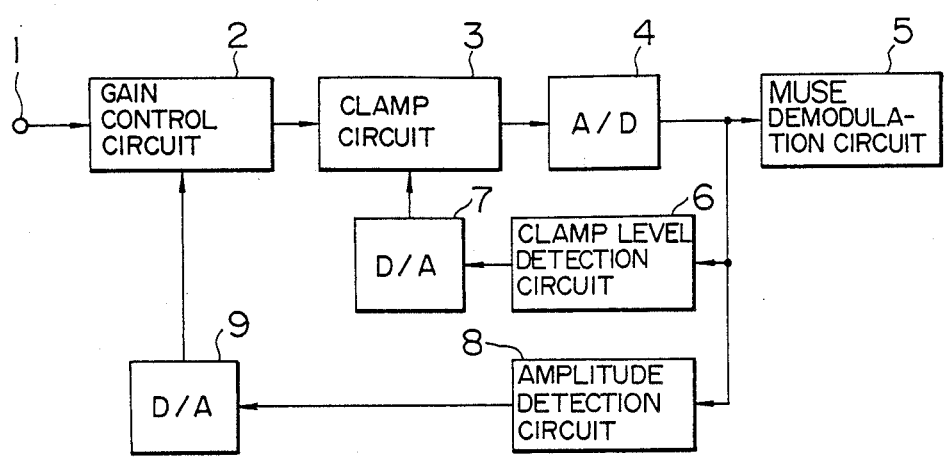
FIG. 2 is a block diagram of a signal control system according to the prior art.

A first embodiment of the present invention will be explained in detail with reference to FIG. 1. Numeral 11 designates a TV signal input terminal of MUSE system, numeral 12 a gain control circuit for controlling the amplitude by a control voltage applied externally, numeral 13 a clamp circuit for controlling the DC potential of the TV signal by a control voltage applied from externally, numeral 14 an A/D converter, numeral 15 a demodulator circuit for demodulating a MUSE signal into an original high-definition signal by digital signal processing, and numeral 16 a clamp level detection circuit for digitally detecting the amount of deviation of the DC potential of the clamp level line from the level of 128/256 and generating a clamp level control signal. Numeral 17 designates an amplitude detection circuit for detecting the amplitude of a frame pulse predetermined to the 100% amplitude and digitally detecting the difference thereof from a maximum amplitude value determined in the demodulation circuit thereby to produce a gain control signal. Numeral 18 designates a first switching circuit for supplying output signals of the two detection circuits alternately to the next stage. Numeral 19 designates a D/A converter for converting the digital control signal into an analog voltage, numeral 20 a buffer amplifier for transmitting the output of the D/A converter to the next stage through a low impedance, and numeral 21 a second switching circuit adapted to be turned on during the period when the output signal of the clamp level detection circuit is supplied to the D/A converter as a control signal. Numeral 22 designates a capacitor to be charged by the voltage supplied during the on period of the second switching circuit 21 and holding the same voltage during the off period of the circuit 21. Numeral 23 designates an operational amplifier for receiving with a high impedance the voltage held in the capacitor, and amplifying an supplying the same voltage as a control voltage to the clamp circuit. Numeral 24 designates a variable voltage source for providing an offset to shift the range of variation of the analog control voltage produced from the D/A converter into a variation range most suitable for the clamp circuit. Numeral 25 designates a third switching circuit turned on during the period when the output signal of the amplitude detection circuit is supplied to the D/A converter as a control signal. Numeral 26 designates a capacitor charged by a voltage supplied during the period when the third switching circuit 25 is on and holding the same voltage during the period when the third switching circuit 25 is off. Numeral 27 designates an operational amplifier of a high impedance supplied with the voltage held in the capacitor and amplifying and supplying the same voltage as a control voltage to the gain control circuit. Numeral 28 designates a variable voltage source for providing an offset in order to shift the variation range of the analog control voltage produced from the D/A converter to a variation range most suitable to the gain control circuit. Each block shown in this embodiment is well known and will not be explained in detail.

The channel-switching operation or a drop-out of VTR or the like may cause an instantaneous pull-out or asynchronous state. According to the arrangement of the first embodiment, a pull-out prevents a timing pulse for detection of a clamp level of amplitude from appearing at normal position relative to the video signal, with the result that the detection data, that is, the control signal assumes an abnormal value. As a consequence, the amplitude or DC potential of the video signal becomes abnormal, so that the image on the display screen becomes abnormal, though momentarily, thereby often spoiling the picture. This is also liable to have an adverse effect on the pull-in. In the case of an instantaneous pull-out at the time of channel switching or a drop-out, therefore, the control signal voltage before the pull-out can be preferably held. This purpose is achieved by either of two methods. The first method is by digital signal processing means for interrupting the clock of the latch circuit at the signal output stage of the amplitude detection circuit and the clamp level detection circuit for the pull-out period by the pull-out detection signal, while the second method is by controlling the second and third switching circuits 21 and 25 converted into an analog signal by the pull-out detection signal. An example of a configuration using the second method will be explained below as a second embodiment with reference to FIG. 3.

Figure 3:
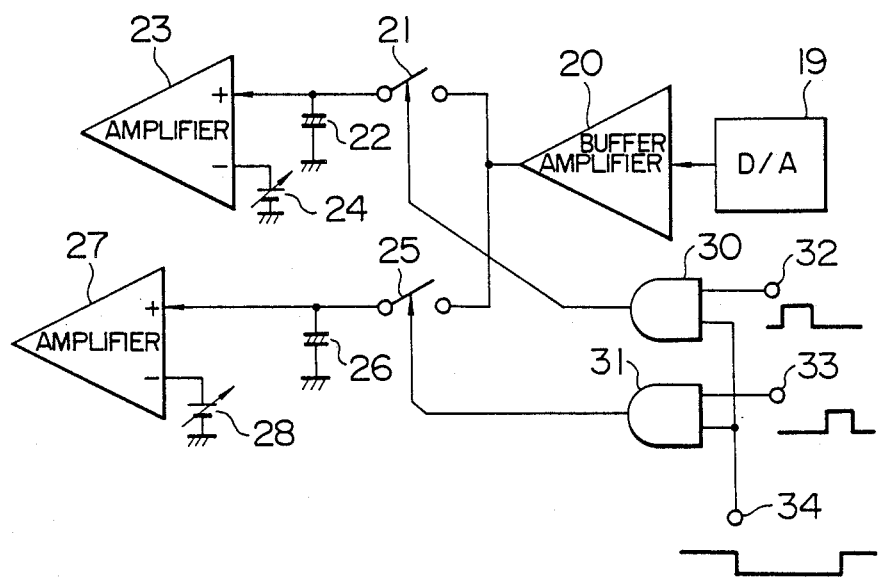
FIG. 3 is a block diagram showing a television video signal control system according to a second embodiment of the present invention.

In FIG. 3, numerals 19 to 27 designate circuit parts similar to those described above in FIG. 1 and will not be explained any further, although the switching circuits 21 and 25 are shown by symbols. These switches, as shown, are adapted to turn on and off by the respective external control pulse, so that the switch 21 is controlled by the output of an AND gate 30, and the switch 25 by the output of an AND gate 31. In the case shown, both the gate circuits are turned on at "1" level. One input of each of the two AND gates is supplied with a pulse by way of the input terminals 32 and 33 at such a timing as to turn on the switch circuits respectively. These two pulses are synchronous with the respective pulses for controlling the switch circuit 18 which operates to switch the output control signals of the clamp level detection circuit 16 and the amplitude detection circuit 17 shown in FIG. 1. Numeral 34 designates a pull-out detection pulse input terminal, which is normally supplied with "1" signal to pass the control pulses 32 and 33 through the AND gate and is switched to "0" to cut off the control pulses when the system is asynchronous state. In asynchronous state, therefore, the switching circuits are turned off, and the capacitors 22 and 26 hold their voltages charged before occurrence of the state. According to the present embodiment, the control pulses for the switching circuits are thus applied separately. Instead of such two groups of pulses, however, one group of pulses may be used in such a manner that the circuit 21 is turned on at "1" level of the pulse and the circuit 25 turned on at "0" level thereof. For example, even with such a control signal, two switching circuits can be controlled separately by two groups of signals which may be produced with one of them inverted through a gate circuit. By thus providing control signals for the switching circuits 21 and 25 respectively, the control function is performed by the same circuit as shown in FIG. 3 in pull-out state.

At the time of power throw in or when the input signal is interrupted for long time, on the other hand, the above control by the control voltage held as explained in FIG. 3 can not be expected, and therefore a new method of control is required. Such a method will be explained as a third embodiment with reference to an example of configuration shown in FIG. 4.

Figure 4:
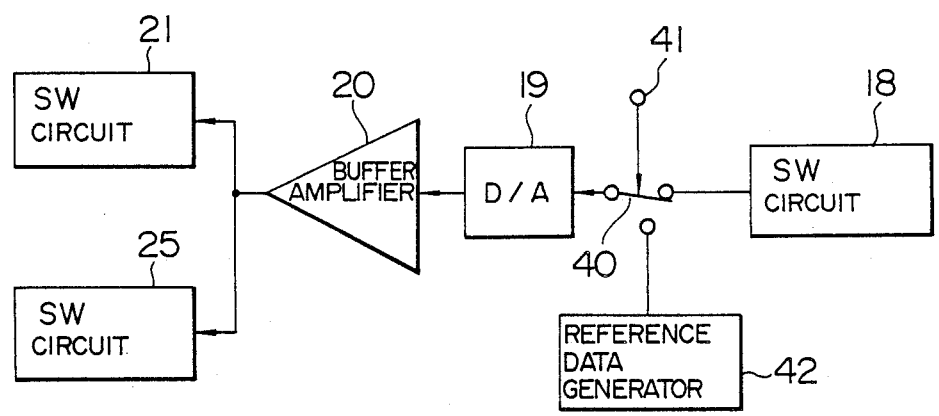
FIG. 4 is a block diagram of a television video signal control system according to a third embodiment of the present invention.

In FIG. 4, blocks 18 to 25 designate exactly the same circuit parts as shown in FIG. 1 respectively and will not be described. Numeral 40 designates a switch for change-over of digital signals and has a first input terminal connected to the output of the switching circuit 18, and a second input terminal connected to the output of a reference data generator 42 described later. The signal output of the switch is supplied to the D/A converter 19. This switch 40, which is controlled by a control signal applied externally, is normally connected at the first terminal. At the time of starting electric power supply (power throw-in) or occurrence of a protracted input signal interruption in which a pull-out or asynchronous state continues for a long duration, however, the switch 40 is turned to the second input terminal by the external control signal applied to the switch control signal input terminal 41. The second input terminal, is connected with the reference data generator 42 for generating a digital signal and is supplied with data constituting a reference signal corresponding to the central value of a normal control signal. This data corresponding to the central value has, for example, a value of 128 for data of 8 bits, that is, a binary number of 1000000. Under normal conditions, it is recommended to provide an offset of an amplifier in subsequent stage in such a manner that the control signal is centered on the above-mentioned value. The central value mentioned above is not fixed but may of course be required to be set to an optimum value for the circuit involved.

We claim:

1. A signal control system for an analog-digital conversion means for converting an input analog video signal into a digital video signal, said input video signal being of a type having a reference DC potential level and a sync signal portion of a fixed amplitude and said analog-digital conversion means producing said digital video signal which includes a sync signal portion of fixed amplitude and a DC potential portion, said system comprising:
   amplitude detection means for detecting said amplitude portion of the sync signal portion of the digital video signal to produce a first digital signal for gain control;
   clamp-level detection means for detecting said DC potential portion of the digital video signal representing said reference DC potential level to produce a second digital signal for clamp potential control;
   digital-analog conversion means for receiving and converting the first digital signal and the second digital signal alternately into a first analog voltage signal and a second analog voltage signal respectively;
   first sampling-holding means and second sampling-holding means respectively for alternately sampling and holding the first analog voltage signal and the second analog voltage signal;
   gain control means for controlling an amplitude of the input video signal responsive to an output of said first sampling-holding means;
   clamping means for controlling said reference DC potential level of the input video signal responsive to an output voltage of said second sampling-holding means;
   sampling preventing means for carrying out a sampling prevention operation to prevent sampling operations of the first sampling-holding means and the second sampling-holding means responsive to a short asynchronous state of the digital video signal in order to cause said first sampling-holding means and said second sampling-holding means to hold continuously during said asynchronous state signals held by them immediately before occurrence of the asynchronous state, and for releasing said sampling prevention operation to enable said sampling operations responsive to a synchronized state of the digital video signal;
   means for providing a substitute digital signal within a range of said first digital signal and said second digital signal; and
   switching means for carrying out a receipt prevention operation to prevent said digital-analog conversion means from receiving and converting the first digital signal and the second digital signal and supplying instead to the conversion means said substitute signal responsive to a long period of asynchronous state of said digital video signal, and for releasing said receipt prevention operation to cause said digital-analog conversion means to receive and convert said first digital signal and said second digital signal responsive to a synchronized state of the digital video signal.

2. A signal control system for analog-digital conversion of an input analog television signal of a type having a reference DC potential level and a sync signal portion of a fixed amplitude, the system comprising:
   an analog-digital converter for converting the input analog television signal into a digital television signal having a DC potential portion representing the reference DC potential level and a sync signal portion;

an amplitude detection circuit for detecting an amplitude portion of the sync signal portion of the digital television signal to produce a first digital control signal for gain control;

a clamp-level detection circuit for detecting said DC potential portion of the digital video signal to produce a second digital control signal for clamp potential control;

a first switching circuit for receiving and alternately outputting the first digital control signal and the second digital control signal;

a digital-analog converter for receiving and converting the first digital control signal and the second digital control signal from the first switching circuit and the second switching circuit and converting them into analog voltages respectively;

a first sample-hole circuit and a second sample-hold circuit for sampling through second and third switching circuits switching synchronously with the first switching circuit to hold a first analog signal and a second analog signal of the converted analog voltages respectively;

a gain control circuit for controlling the amplitude of the input analog television signal in response to the first analog signal held by the first sample-hold circuit to provide an amplitude controlled television signal and apply the same to said analog-digital converter;

a clamp circuit for controlling the DC potential level of the input analog television signal in response to the second analog signal held by the second sample-hold circuit to provide a level controlled television signal and apply the same to said analog-digital converter;

a sampling prevention circuit for carrying out a sampling prevention operation by turning off the second switching circuit and the third switching circuit to prevent a sampling operation of the first sample-hold circuit and the second sample-hold circuit responsive to a short asynchronous state of the digital television signal in order to cause the first sample hold circuit and the second sample hold circuit to hold continuously during said asynchronous state respective analog signals held immediately before occurrence of the asynchronous state, and for turning on the second switching circuit and the third switching circuit to release said prevention operation and to enable their sampling operation responsive to a synchronized state of the digital television signal;

means for providing a substitute digital signal within a range of said first digital signal and said second digital signal; and a fourth switching circuit for carrying out a receipt prevention operation to prevent the digital-analog converter from receiving and converting the first digital control signal and the second digital control signal and to supply to the converter instead of the first digital control signal and the second digital control signal said substitute signal in response to a long period of asynchronous state of the digital television signal, and for releasing said prevention operation to cause the digital-analog converter to receive and convert the first digital control signal and the second digital control signal responsive to a synchronized state of the digital television signal.

* * * * *